Nov. 28, 1967    L. J. POSTULA ETAL    3,354,589
PORTABLE JOINTER SHARPENER

Filed June 29, 1965    3 Sheets-Sheet 1

INVENTORS
LOUIS J. POSTULA
VICTOR A. POSTULA
BY
Frank B Hill
ATTORNEY

Nov. 28, 1967    L. J. POSTULA ETAL    3,354,589
PORTABLE JOINTER SHARPENER

Filed June 29, 1965    3 Sheets-Sheet 3

INVENTORS
LOUIS J. POSTULA
VICTOR A. POSTULA
BY
Frank B. Hill
ATTORNEY

United States Patent Office 3,354,589
Patented Nov. 28, 1967

3,354,589
PORTABLE JOINTER SHARPENER
Louis J. Postula, Victor A. Postula, both of R.F.D. 3,
Marshall, Mich. 49068
Filed June 29, 1965, Ser. No. 467,993
12 Claims. (Cl. 51—249)

The present invention relates broadly to a grinder for sharpening cutting edges, and in its specific phases to a portable blade sharpener assembly unit for sharpening the cutting blades of a rotary jointer head.

Various methods of sharpening jointer blades have been perfected over the years. One of the more commonly used methods is to remove the cutting blades from the jointer head for sharpening. The blades then have to be reset in the junior head. Difficulty has been experienced at resetting the blades back in the jointer head and positioning them parallel with the jointer head axis and maintaining them all at the same level from the jointer head axis as the other cutting blades. On some jointer machines the axis can get out of alignment with the jointer bed and further complicates proper setting. This method of sharpening a jointer machine's cutting blades is time consuming and substantially reduces the amount of productivity during change-over. Because of this and other causes, jointer blades become dull and remain in continued use; thus, reducing the quantity and quality of the work which can be produced. When the cutting blades are dull it increases the possibility of injury to the user in that a grabbing action may take place between the workpiece and the jointer head cutting blades jerking the workpiece and causing an operator's hand to be yanked into the jointer head, cutting or otherwise injuring him.

Some people have attempted to provide pieces of equipment for grinding the jointer cutting blades while on the machine. No commercially satisfactory unit has been developed to date. The units developed have been quite complicated and expensive. Some were made for only one machine, and others were useable on more than one jointer machine, but were not universal enough in application and because of this and other reasons they have not been successful.

Accordingly, among the objects of the present invention is to provide a means for portably mounting a grinding wheel on the bed of a jointer machine whereby the grinding wheel may be moved along the cutting edge of each cutter blade to sharpen it while its jointer head is held in a stationary position.

Another object is to provide a novel jointer sharpener attachment for sharpening jointer head cutting blades of a jointer machine with the blades in substantially their cutting action position without making permanent contact to the cutter bed.

A further object is to provide a sharpening unit which can hollow grind jointer blades and can be quickly adjusted for rough and finish grinding depths.

A further object is to provide a jointer blade sharpening unit which is portable in nature and can be positioned to fit various jointer machine beds.

A further object is to provide a jointer blade sharpening unit in which is provided an inherent independent locking means to lock the jointer head in position for the jointer sharpening unit to sharpen all the cutting blades in substantially the same position.

A further object is to provide an adjustment means for a jointer blade sharpener assembly unit so that it may be easily adjusted to control the depth of sharpening and the form of the hollow ground profile.

Also, an object of the present invention includes the provision of jointer sharpener assembly unit structure capable of accomplishing the above objectives with a minimum of material cost and fabricating expense, and at the same time being composed of a simple and ruggedly formed structure which is very reliable in application.

Still further objects and advantages of the present invention will appear as the description proceeds.

To the accomplishment of the foregoing and related ends, the invention, then, consists of the special sharpening features and equipment hereinafter fully described and particularly pointed out in the claims, the annexed drawings and the following description setting forth in detail certain means for carrying out the invention, such disclosed means illustrating, however, but several of various ways in which the principle of the invention may be used.

Figure 1:
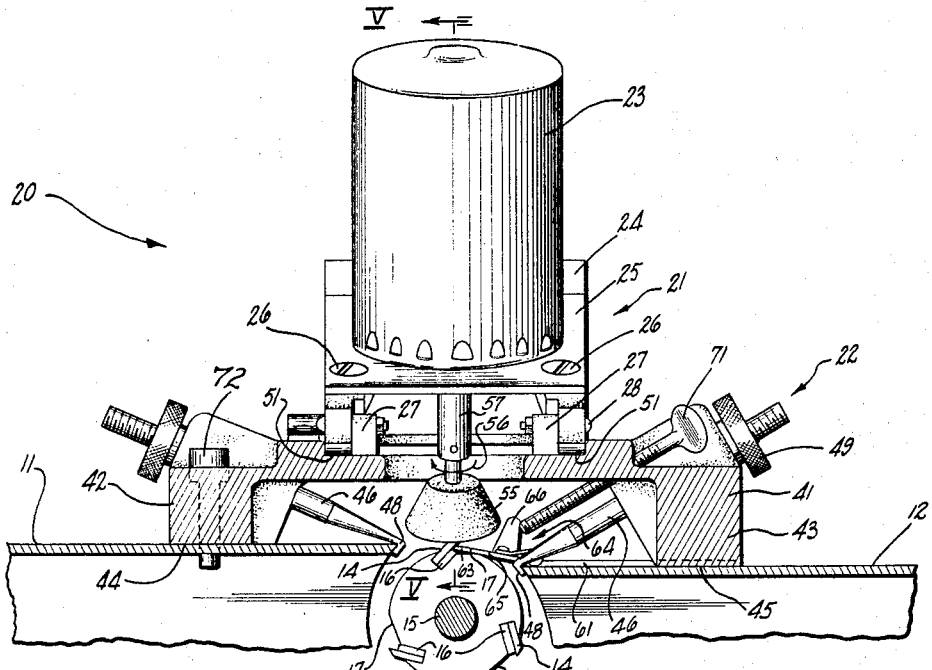
FIGURE 1 is a side elevational view of a jointer machine particularly in cross section showing a jointer cutting blade sharpener assembly unit as it is seen while on the jointer bed, taken substantially along line I—I of FIGURE 3 and viewed in the direction of the arrows.
Figure 2:
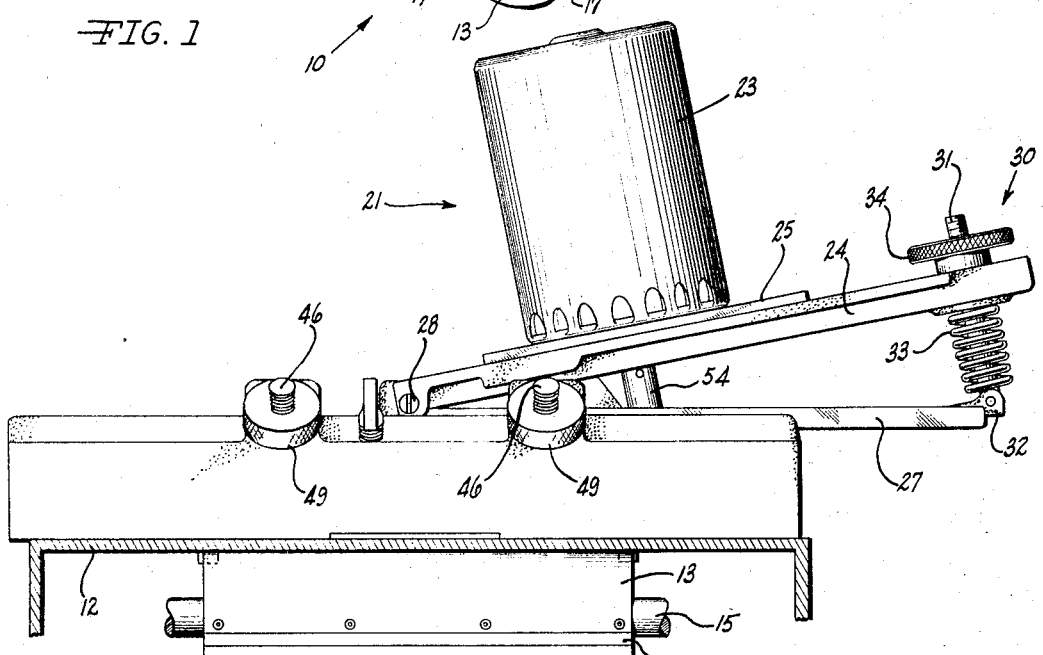
FIGURE 2 is an end view of the jointer machine and shown in FIGURE 1 and taken along line II—II of FIGURE 3.

Referring generally to FIGURES 1 and 2, there is shown a jointer machine bed and cutting tool assembly generally referred to as 10. The assembly 10 has a stationery jointer table 11, an adjustable jointer table 12, and a jointer head 13. The jointer head 13 has a series of cutting blades 14 secured on its circumference and it is mounted on a driven shaft 15. The driven shaft 15 rotates the jointer head 13 in a clockwise manner as viewed in FIGURE 1. The jointer head 13 has chip breakers 16 positioned with the cutting blades 14 to break up the chips cut by the blades. The cutting blades 14 and chip breakers 16 can be mounted in various manners well known in the art.

The jointer head illustrated in the preferred embodiment of FIGURE 1 has flat surfaces 17 positioned just ahead of the cutting blades 14. During operation, a piece of material will be fed to the jointer by moving it along the adjustable jointer table 12, passing it over the jointer head 13 where the cutting blades 14 will cut the surface to substantially the same height as the stationary jointer table 11. This is a well-known and practiced procedure in the art.

The present invention discloses a sharpener member assembly 20 which can be adapted with various jointer machine units to sharpen the cutting blades 14 while they remain mounted in the jointer head 13. The sharpener member assembly 20 sharpens them along a surface substantially even with the surface of the stationary jointer table 11. The sharpener member assembly 20 has a sharpener unit 21 and a sharpener adapter member 22. The sharpener unit has a motor 23 adjustably mounted on a motor mount frame 24. The motor 23 is supported by a mounting plate 25 which is fastened to the motor mount frame 24 by securing bolts 26. The motor 23 is thus permitted to be adjusted along the motor mount frame 24 at any desired position. The motor mount frame 24 is connected at one end to a guide frame 27 by bolts 28. The other end of motor mount frame 24 is connected to the guide frame 27 by adjustment assembly 30. The adjustment assembly 30 has a threaded bolt 31 rotatably or pivotally connected to the guide frame 27 by pivot support 32. A coil spring 33 is mounted to the threaded bolt 31 and continually urges mount frame 24 away from the guide frame 27. A knob 34 is turned on the end of threaded bolt 31 and is used for adjustment purposes to determine the distance motor mount frame 24 can be moved by coil spring 33 away from guide frame 27.

Sharpener adapter member 22 can be used to mount the sharpener member assembly 20 to various jointer machine bed and cutting tool assemblies 10. The sharpener adapter member 22 has an adapter body 41 with body rib members 42 and 43 and these rib members have table contact surfaces 44 and 45 which contact stationary jointer table 11 and adjustable jointer table 12, respectively. The adapter body 41 has securing members 46 with hook tips 48, in the present illustration three are shown. The hook tips 48 contact the edges of the jointer tables 11 and 12 and secure the sharpener adapter member 22 to the jointer machine bed by turning a knob 49 on the threaded end of the securing member 46.

Figure 3:
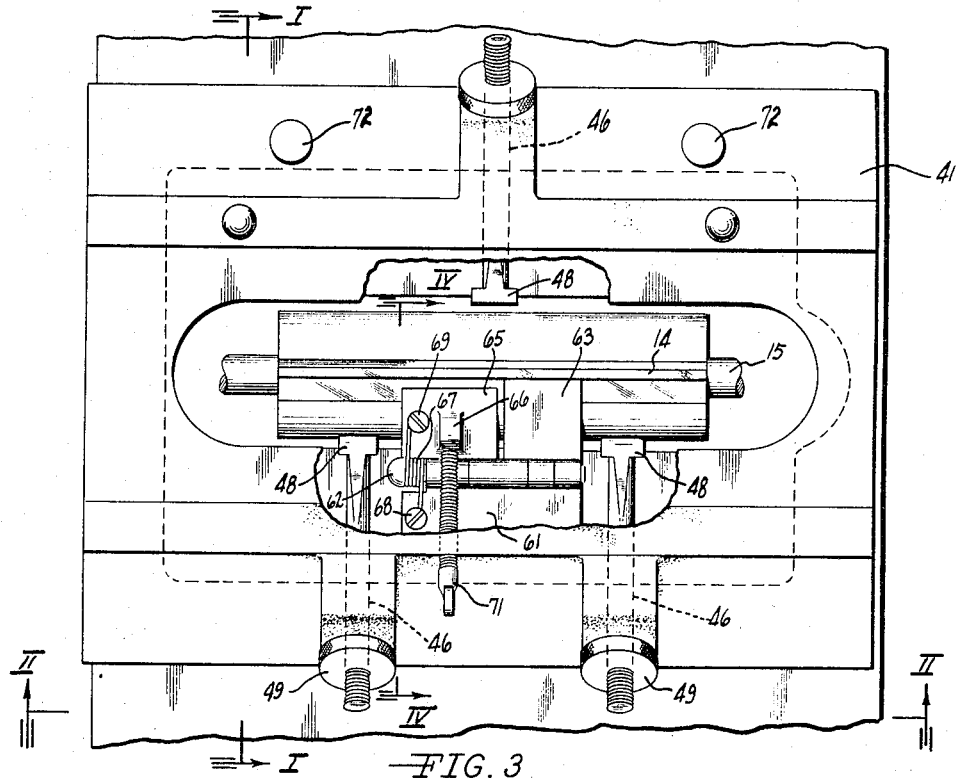
FIGURE 3 is a plan view in part sectional showing the sharpener assembly adapter body secured to the jointer bed.

As viewed in FIGURE 3, there is one securing member 46 connected to stationary jointer table 11 and two securing members 46 connected to adjustable jointer table 12. This provides a three-point contact support means for securing the adapter body 41 as it is mounted on the jointer machine bed and cutting tool assemblies 10. The adapter body 41 has guideways 51 on its upper surfaces which receive the guide frame 27 and permit the sharpener member assembly 20 to be moved back and forth along the adapter body 41 and over the jointer head 13.

Figure 5:
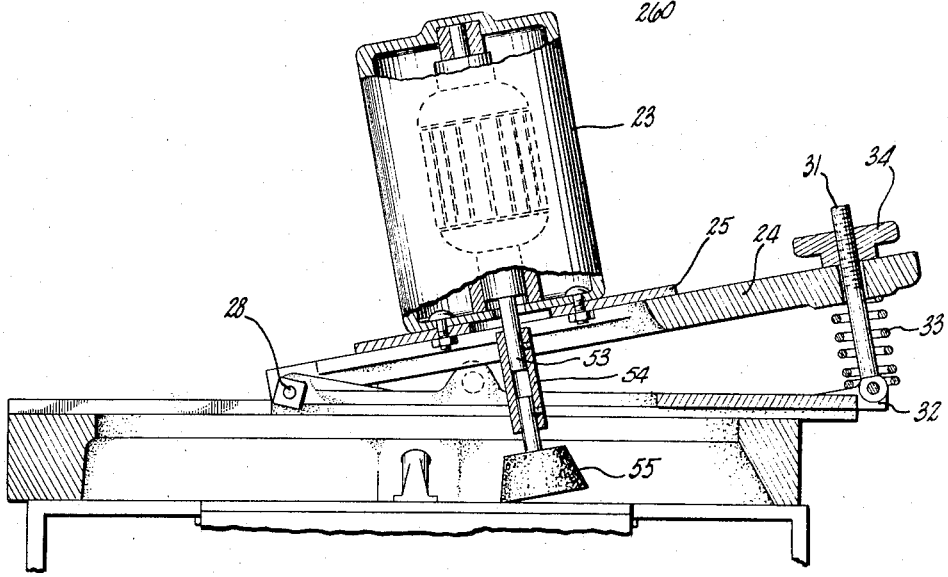
FIGURE 5 is a partial sectional end view showing the cutter blade grinding assembly in grinding position and taken along line V—V of FIGURE 1.

The motor 23 as viewed in FIGURE 5 has a motor shaft 53 that connects to a wheel chuck 54 which supports a grinding wheel 55. In the present illustration, the grinding wheel 55 is a cone-shaped cup wheel. The jointer head 13 will be rotated and locked into position, as will be explained below, so that the grinding wheel 55 will contact a cutting blade 14. To sharpen the blade 14 the sharpener unit 21 will be moved along guideways 51 so that the grinding wheel 55 can contact the complete length of the cutting blade 14. Normally, all the cutting blades 14 would be cut at the same depth as a roughing operation with the grinding wheel 55 being rotated in a direction indicated by arrow 56 in FIGURE 1. After all the cutting blades 14 have been rough ground, the knob 34 of adjustable assembly 30 would be turned moving the grinding wheel 55 down a very small amount and then all the cutting blades 14 would be finished ground for sharpening at this final depth. This illustration permits the grinding wheel 55 to hollow grind the cutting blade 14. The grinding wheel 55 contacts the cutting blade 14 at its cutting edge first and then moves away from it. The grinding wheel 55 only contacts the cutting blade 14 a small percent of each grinding revolution helping the grinding wheel to remain cool and clean. Because of the hollow grind action of the grinding wheel 55 on the cutting blade 14, any requirement for honing the cutting blade 14 is eliminated.

Figure 4:
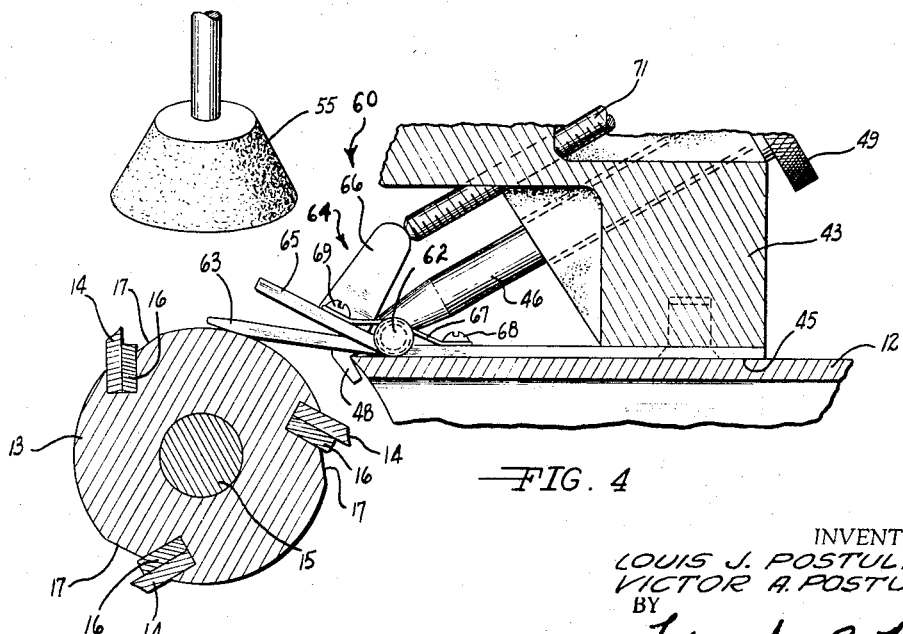
FIGURE 4 is a partial sectional side view showing the jointer head being indexed from one sharpening operation to the next and taken along line IV—IV of FIGURE 3.

Referring generally to FIGURES 3 and 4, we have a locating and locking assembly generally referred to as 60 as part of the sharpener adapter member 22. A support plate 61 is secured with the body rib 43 and extends toward the jointer head 13 between the securing members 46 of body rib 43. The support plate 61 has a pivot pin 62 on which is pivotally mounted a locating plate 63 and a locking member 64. The locking member 64 has a locking plate 65 and a locking dog 66. A coil spring 67 has one end secured to support plate 61 by a screw 68 and one end secured to the locking plate 65 by a screw 69. The coil spring 67 continually urges the locking member to rotate in an up movement or a clockwise direction about pivot pin 62 as viewed in FIGURE 4. A tightening member 71 is threaded into adapter body 41 and has one end acting on locking dog 66. When a jointer head's 13 cutting blade 14 rotates into sharpening position, the locating blade 63 is in contact with the cutting blade 14. At this time the tightening member 71 is turned so as to move it toward the jointer head 13 causing its end to act on the locking dog 66 and move the locking plate 65 into contact with the flat surface 17 of jointer head 13. The locking plate 65 contacts the flat surface 17 in such a manner as to rotate the jointer head 13 in a clockwise direction about the axis of driven shaft 15 as viewed in FIGURES 1 and 4. The locating plates 63 acts on cutting blade 14 preventing the jointer head 13 from rotating and thus positions the cutting blades 14 in their sharpening position. After the cutting blade 14 is sharpened, the tightening member 71 will be turned permitting the coil spring 67 to move the locking member 64 out of contact with the flat surface 17. Then the locking plate 63 can be raised and the jointer head can then be rotated bringing another cutting blade 14 into position and the locking procedure can be repeated as just explained.

The table contact surfaces 44 and 45 need not make a flat surface contact with the jointer tables, but only need to make substantial contact to provide a level and stable position for each sharpening operation. If adjustment of the jointer tables with the sharpener member assembly is necessary, the adjustable jointer table 12 can be raised or lowered giving the proper stability of contact. For some applications locating pins 72 may be used to position the sharpener adapter member 22 in position on stationary jointer table 11. Holes would be provided on the jointer table 11 for the pins 72 to drop into, thus positioning guideways 51 in their desired relationship with the driven shaft.

Figure 6:
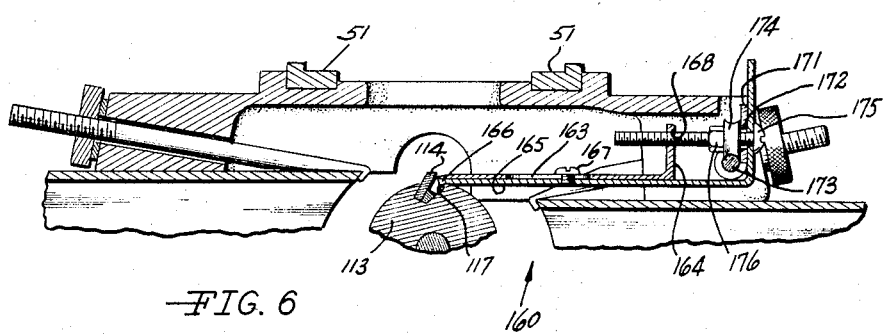
FIGURE 6 is a partial sectional view of the cutter blade grinding assembly's adapter body showing an alternate means of positioning the jointer head in position for sharpening.

Referring generally to FIGURE 6, the sharpener member assembly 20 will have all the same sharpening elements as explained above; however, it will have an alternate locating and locking assembly 160. There is a jointer head 113 with flat surfaces 117 adjacent cutting blades 114. A locking plate 165 has a locking hook 166 which will contact one of flat surfaces 117 when its adjacent cutting blade 114 is in position for sharpening. A locating plate 163 is adjustably mounted to the locking plate 165 by a securing screw 167. The locating plate 163 has a flange 164 with a threaded hole 168. A stationary plate 171 is connected to the adapter body 41 and has a slot 172 which extends along its length. A stationary bar 173 is mounted parallel to the slot 172 and supports a positioning member 174 which is mounted to a tightening bolt 175. The tightening bolt 175 can be turned in threaded hole 168 which moves locating plate 163 toward, or away from, cutting blade 114. When the tightening bolt 175 moves locating plate 163 toward the cutting blade 114, the end of locating plate 163 will tend to move jointer head 113 in a counterclockwise direction about driven shaft 15 while being force against it. Locking hook 166 will prevent this rotation and the cutting blade 114 will then be locked in position for sharpening. A securing nut 176 is positioned on tightening bolt 175 and in threaded engagement with it. When the locating plate 163 is in position for holding the cutting blade 114 in its locking position for sharpening, the securing nut 176 will be turned so as to move along tightening bolt 175 toward stationary plate 171 locking the assembly in fixed position along slot 172. In many applications the tightening bolt 175 will not need to be adjusted along a slot 172. In those situations there would be no need for the securing nut 176, the positioning member 174 and the stationary bar 173, and the locating and locking assembly would function properly.

Figure 7:
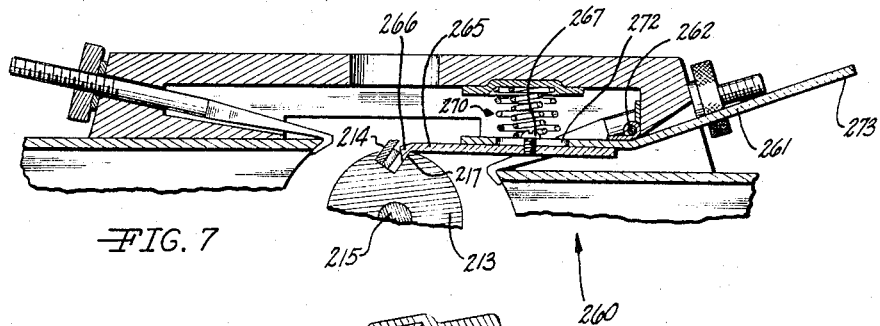
FIGURE 7 is another alternate partial sectional view of the cutter blade grinding assembly's adapter body showing an alternate means of positioning the jointer head in position for sharpening.

Referring generally to FIGURE 7, we have a locating and locking assembly 260 with a locking plate 265 which has a locking hook 266. The locking plate 265 is connected to a support plate 261 by a securing screw 267. The support plate 261 is pivotally connected to a pivot pin 262. The securing screw 267 is threaded into locking plate 265 and permits it to be adjustably positioned with respect to support plate 261 by movement along slot 272. Spring assembly 270 continually urges the locating and locking assembly 260 in a counterclockwise direction about pivot pin 262. The locking hook 266 contacts a flat surface 217 of a jointer head 213 adjacent cutting blade 214 and acts on this surface to hold the jointer head 213 in a fixed position on driven shaft 215 so that the cutting blade 214 is in grinding position. After the cutting blade 214, is ground, the supporting plate 216 is pushed on handle end 273 rotating the locating and locking assembly 260 in a clockwise direction about pivot pin 262 removing the locking hook 266 from contact with flat surface 217 and permitting the jointer head 213 to be rotated bringing another cutting blade into sharpening position.

While but several forms of the invention have been shown and described, other forms within the spirit and scope of the invention will now be apparent to those skilled in the art. Therefore, the embodiments shown in the drawings are to be considered as merely set forth for illustrative purposes and are not intended to limit the scope of the invention herein described and set forth. Also, directional terms such as "inwardly," "outwardly," "up," "down," et cetera, are used to facilitate explaining and claiming the invention as described in the specification and claims, and as illustrated in the drawings, and are not to be considered as limiting the invention.

Other modes of applying the principles of our invention may be employed instead of those explained, change being made as regards the apparatuses herein disclosed provided the means and features stated by any of the following claims or the equivalent of such stated means and features be employed.

We therefore particularly point out and distinctly claim as our invention:

1. A sharpening member assembly for use on a jointer machine bed with two table portions separated by an opening exposing a jointer head having one or more cutting blades comprising in combination,
   (a) a sharpener adapted member having guide means, and supported by said table portions,
   (b) a grinding wheel and grinding wheel unit supported by said sharpener adapted member and guided by said guide means,
   (c) a locating means to locate said sharpener adapted asembly on said jointer machine bed,
   (d) adjustable means to secure said sharpener adapted member to said jointer machine bed,
   (e) said sharpener adapter member positioning said grinding wheel over said jointer head,
   (f) means on said sharpener adapter member to secure said jointer head in a sharpening position,
   (g) said guide means to guide said grinding wheel along said cutting blade when said jointer head is in said sharpening position,
   (h) said grinding wheel unit having a guide frame positioned in said guide means,
   (i) a mount frame as part of said grinding wheel unit supporting said grinding wheel and pivotally connected at one end to said guide frame by bolts, and
   (j) means connected to the other end of said mount frame to adjustably position said mount frame in a fixed angular position with respect to said guide frame during said sharpening operation.

2. A jointer head cutter blade sharpening assembly as specified in claim 1, and further characterized in that
   (a) said means to locate and lock said jointer head in sharpening position includes a locking member and an adjacent locating plate,
   (b) said locating plate contacting the cutting blade and preventing its further rotation in one direction, and
   (c) said locking member contacting said jointer head and urging said cutting blade into contact with said locating plate.

3. A jointer head cutter blade sharpening assembly as specified in claim 2, and further characterized in that
   (a) a support plate inherent with said sharpener adapter member and pivotally supporting said locking member and said locating plate,
   (b) a coil spring connected to said locking member and continuously urging it away from said jointer head, and
   (c) a tightening member connected with said sharpener adapted member and having means to act on said locking member holding it into contact with said jointer head.

4. A jointer head cutter blade sharpening assembly as specified in claim 3, and further characterized in that
   (a) said securing means having two adjustable securing members with hook tips contacting one of the table portions,
   (b) one of said securing members being positioned on one side of said support plate and the other one of said securing members being positioned on the opposite side of said support plate, and
   (c) a securing member with a hook tip contracting the other of said table portions as part of said securing means.

5. In a jointer head cutter blade sharpening attachment for use on a jointer machine having
   (a) a jointer machine bed with two separate table portions separated by an opening exposing said jointer head,
   (b) an adapter body positioned over said jointer head and supported by said table portions,
   (c) securing means to hold said adapter body in a fixed position with said jointer head,
   (d) guideways on said adapter body,
   (e) a sharpener unit having a rotatable grinding wheel supported by said guideways,
   (f) means to locate and lock said jointer head in sharpening position,
   (g) said guideways to guide said grinding wheel along the cutting edge of said cutting blade when said jointer head is in said sharpening position,
   (h) said sharpener unit having a guide frame positioned in said guideways,
   (i) a mount frame pivotally connected to said guide frame by bolts and supporting said grinding wheel,
   (j) means to adjustably position said mount frame in a fixed angular position with respect to said guide frame,
   (k) said means to locate and lock said jointer head in sharpening position including a locking member and an adjacent locating plate,
   (l) said locating plate contacting the cutting blade and and preventing its further rotation in one direction, and
   (m) said locking member contacting said jointer head and urging said cutting blade into contact with said locating plate.

6. A jointer head cutter blade sharpening assembly as specified in claim 5, and further characterized in that
   (a) a supporting plate inherent with said adapter body and pivotally supporting said locking member and said locating plate,
   (b) a spring means connected to said locking member and continually urging it away from said jointer head, and (c) a tightening member connected with said adapter body and acting on said locking member forcing it into contact with said jointer head.

7. A jointer head cutter blade sharpening assembly as specified in claim 6, and further characterized in that
(a) said securing means having two adjustable securing members with hook tips contacting one of the table portions and one of said securing members being on one side of said support plate and the other one on the other side, and
(b) a securing member with a hook tip contacting the other of said table portions as part of said securing means.

8. A sharpener member assembly for use on a jointer machine bed with two table portions separated by an opening exposing a jointer head having one or more cutting blades comprising in combination,
(a) an adapter body having guide means, and supported by said table portions,
(b) a power driven grinding wheel and grinding wheel unit supported by said adapter body and guided by said guide means,
(c) locating and adjustable securing means for holding said adapter body in a fixed position on said jointer machine bed,
(d) said adapter body positioning said grinding wheel over said jointer head,
(e) said grinding wheel being in a cone shape,
(f) said grinding wheel unit has a guide frame positioned in said guide means,
(g) a mount frame as part of said grinding wheel unit supports said grinding wheel and is pivotally connected at one end to said guide frame by bolts, and
(h) means connected to the other end of said mount frame to adjustably position said mount frame in a fixed angular position with respect to said guide frame during said sharpening operation.

9. A jointer head cutter blade sharpening assembly as specified in claim 8, and further characterized in that
(a) said means to locate and lock said jointer head in sharpening position includes a locking member and an adjacent locating plate,
(b) said locating plate contacting the cutting blade and preventing its further rotation in one direction,
(c) said locking member contacting said jointer head and urging said cutting blade into contact with said locating plate,
(d) a support plate inherent with said sharpener adapter member and pivotally supporting said locking member and said locating plate,
(e) a coil spring connected to said locking member and continuously urging it away from said jointer head, and
(f) a tightening member connected with said sharpener adapter member and having means to act on said locking member holding it into contact with said jointer head.

10. A jointer head cutter blade sharpening assembly as specified in claim 8, and further characterized in that
(a) said means to locate and lock said jointer head in sharpening position includes a locating plate and a locking hook,
(b) said locating plate contacts the cutting blade and acts on it to rotate it in one direction, and
(c) said locking member contacts said jointer head preventing its further rotation by said locating plate.

11. A jointer head cutter blade sharpening assembly as specified in claim 8, and further characterized in that
(a) said means to locate and lock said jointer head in sharpening position includes a spring loaded locking plate having a locking hook and flat surface on said jointer head,
(b) said spring continuously urges said locking plate towards said jointer head, and
(c) said locking hook contacts said flat surfaces to move said jointer head to a predetermined angular position.

12. In a jointer head cutter blade sharpening attachment for use on a jointer machine having
(a) a jointer machine bed with two separated portions separated by an opening exposing said jointer head,
(b) an adapter body positioned over said jointer head and supported by said table portions,
(c) securing means to hold said adapter body in a fixed position with said jointer head,
(d) two guideways on said adapter body in substantially a horizontal parallel plane and positioned on opposite sides of said opening,
(e) a sharpener unit having a rotatable grinding wheel supported by and extending between said guideways,
(f) means to locate and lock said jointer head in sharpening position,
(g) said guideways to guide said grinding wheel along the cutting edge of said cutting blade when said jointer head is in said sharpening position,
(h) said sharpener unit having a guide frame positioned in said guideways,
(i) a mount frame pivotally connected to said guide frame by bolts and supporting said grinding wheel,
(j) adjustment means to position said mount frame in a fixed angular position with respect to said guide frame, and
(k) said adjustment means positions said grinding wheel axis in an angular position with respect to said jointer head axis.

References Cited

UNITED STATES PATENTS

| | | | |
|---|---|---|---|
| 2,414,285 | 1/1947 | Bloomingburg | 51—225 |
| 2,476,177 | 7/1949 | Bloom et al. | 51—249 |
| 2,549,147 | 4/1951 | Walters | 51—225 |
| 2,729,923 | 1/1956 | Durst | 51—249 |
| 3,149,444 | 9/1964 | Schneider | 51—249 |

FOREIGN PATENTS

| | | |
|---|---|---|
| 2,147 | 6/1914 | Great Britain. |

ROBERT C. RIORDON, *Primary Examiner.*

J. A. MATHEWS, *Assistant Examiner.*

UNITED STATES PATENT OFFICE
CERTIFICATE OF CORRECTION

Patent No. 3,354,589                        November 28, 1967

Louis J. Postula et al.

It is certified that error appears in the above identified patent and that said Letters Patent are hereby corrected as shown below:

Column 1, line 16, "junior" should read -- jointer --. Column 4, line 63, "force" should read -- forced --. Column 5, line 18, "214," should read -- 214 --; same line 18, "216" should read -- 261 --; line 44, "sharpening" should read -- sharpener --; lines 51, 53, and 55, and column 6, line 19, "adapted", each occurrence, should read -- adapter --. Column 5, line 54, "asembly" should read -- assembly --. Column 8, line 16, "surfaces" should read -- surface --.

Signed and sealed this 27th day of January 1970.

(SEAL)

Attest:

Edward M. Fletcher, Jr.

Attesting Officer

WILLIAM E. SCHUYLER, JR.

Commissioner of Patents